US008585111B2

(12) United States Patent
Nammoto et al.

(10) Patent No.: US 8,585,111 B2
(45) Date of Patent: Nov. 19, 2013

(54) ROBOT HAND AND ROBOT APPARATUS

(75) Inventors: Takashi Nammoto, Sendai (JP); Kazuhiro Kosuge, Sendai (JP); Haruaki Chiba, Sendai (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/371,771

(22) Filed: Feb. 13, 2012

(65) Prior Publication Data

US 2012/0205932 A1 Aug. 16, 2012

(30) Foreign Application Priority Data

Feb. 14, 2011 (JP) ................................. 2011-028574

(51) Int. Cl.
*B66C 1/00* (2006.01)
*B66C 1/42* (2006.01)

(52) U.S. Cl.
USPC ............................................ 294/106; 901/38

(58) Field of Classification Search
USPC .................... 294/106, 213; 901/38; 623/64
See application file for complete search history.

(56) References Cited

U.S. PATENT DOCUMENTS

| | | | |
|---|---|---|---|
| 3,901,547 A | 8/1975 | Skinner, II | |
| 4,428,710 A | 1/1984 | Grisebach et al. | |
| 5,108,140 A | 4/1992 | Bartholet | |
| 5,328,224 A * | 7/1994 | Jacobsen et al. | 294/104 |
| 5,501,498 A * | 3/1996 | Ulrich | 294/106 |
| 5,762,390 A * | 6/1998 | Gosselin et al. | 294/106 |
| 6,244,644 B1 * | 6/2001 | Lovchik et al. | 294/111 |
| 6,505,870 B1 | 1/2003 | Laliberte et al. | |
| 6,669,257 B2 | 12/2003 | Laliberte et al. | |
| 6,918,622 B2 * | 7/2005 | Kim et al. | 294/106 |
| 2006/0012197 A1 | 1/2006 | Anderson et al. | |
| 2010/0176615 A1 | 7/2010 | Okuda et al. | |
| 2011/0148132 A1 * | 6/2011 | Park et al. | 294/106 |
| 2011/0241369 A1 | 10/2011 | Kamon et al. | |

FOREIGN PATENT DOCUMENTS

| | | |
|---|---|---|
| JP | 50-148784 | 5/1974 |
| JP | 54-100052 | 8/1979 |
| JP | 60-025686 | 2/1985 |
| JP | 63-201086 | 12/1988 |
| JP | 08-150587 | 6/1996 |
| JP | 2000-288971 | 10/2000 |
| JP | 2003-534930 | 11/2003 |
| JP | 2008-055532 | 3/2008 |
| JP | 2010-036256 | 2/2010 |
| JP | 2010-149270 | 7/2010 |
| JP | 2011-161577 | 8/2011 |

OTHER PUBLICATIONS

Extended European Search Report for Application No. 12 15 4851 mailed on May 15, 2012 (6 pages).

* cited by examiner

*Primary Examiner* — Stephen Vu
(74) *Attorney, Agent, or Firm* — Harness, Dickey & Pierce, P.L.C.

(57) ABSTRACT

A robot hand includes a first finger unit and a second finger unit, a driving unit that causes the finger units to perform an opening and closing action, and a finger-unit moving mechanism that changes a direction in which the opening and closing action of the first finger unit and the second finger unit is performed. The finger-unit moving mechanism includes a worm wheel, a motor, and a worm. A first gear that rotates in a direction different from the rotating direction of the worm in association with the rotation of the worm is provided in the first finger unit. A second gear that rotates in a direction opposite to the rotating direction of the first gear in association with the rotation of the worm is provided in the second finger unit.

14 Claims, 14 Drawing Sheets

ROBOT HAND AND ROBOT APPARATUS

BACKGROUND

1. Technical Field

The present invention relates to a robot hand and a robot apparatus.

2. Related Art

There is known a robot hand that is attached to a robot apparatus such as an industrial robot arm and grips or releases an object to perform predetermined work. In recent years, a multifunction robot hand is proposed that grips, for example, a tool to perform work such as assembly of a component and grips a very small component to accurately arrange the component.

For example, in a robot hand disclosed in JP-A-2008-55532, three finger units that grip an object can be opened and closed by a cam follower mechanism. Further, two finger units among the three finger units are guided by a pair of circumferential grooves formed on the same plane and are enable to turn symmetrically to each other.

In the technique disclosed in JP-A-2008-55532, an opening and closing action and a turning action of the finger units are controlled by the cam follower mechanism. Therefore, the robot hand is considered to be capable of gripping various objects including objects having dissimilar shapes and different sizes.

However, since the structure of the cam follower mechanism is complicated, it is not easy to realize the configuration of the robot hand including the cam follower mechanism. Manufacturing cost for the robot hand increases.

SUMMARY

An advantage of some aspects of the invention is to provide a robot hand and a robot apparatus that can grip, simply and at low cost, various objects including objects having dissimilar shapes and different sizes.

An aspect of the invention is directed to a robot hand including: three or more finger units including a first finger unit and a second finger unit; a driving unit that causes the three or more finger units to perform an opening and closing action; and a finger-unit moving mechanism that changes a direction in which the opening and closing action of the first finger unit and the second finger unit is performed. The finger-unit moving mechanism includes: a worm wheel; a motor that rotates the worm wheel; and a worm that rotates in a direction different from a rotating direction of the worm wheel in association with the rotation of the worm wheel. A first gear that rotates in a direction different from the rotating direction of the worm in association with the rotation of the worm is provided in the first finger unit. A second gear that rotates in a direction opposite to the rotating direction of the first gear in association with the rotation of the worm is provided in the second finger unit. The first finger unit and the second finger unit rotate, when the motor rotates, in a direction in which the finger units move close to each other or a direction in which the finger units move away from each other.

With the robot hand, the direction in which the opening and closing action of the first finger unit and the second finger unit among the three or more finger units is performed is changed when the motor rotates. Therefore, it is possible to change, according to the shape of an object, a direction in which the finger units grip the object. When the object is a spherical body, the direction can be changed such that the finger units wrap up the object (the finger units are equally arranged around the object). On the other hand, when the object is a rod-like member, the direction can be changed such that the finger units hold the object (the finger units are opposed to each other via the object). The robot hand can stably grip the spherical body and the rod-like member according to the change of the direction in which the opening and closing action of the finger units is performed. Therefore, it is possible to provide a robot hand that can grip various objects including objects having dissimilar shapes and different sizes. A combined mechanism of the worm wheel and the worm (a worm gear mechanism) is adopted and the cam follower mechanism is unnecessary. Therefore, it is possible to adopt simple structure and realize a reduction in cost.

In the robot hand, a space between a rotating shaft of the first gear and a rotating shaft of the second gear may be kept fixed.

With this robot hand, the first finger unit including the first gear and the second finger unit including the second gear respectively rotate in fixed positions. Therefore, compared with a configuration in which the space between the rotating shaft of the first gear and the rotating shaft of the second gear fluctuates, it is possible to realize simplification of the apparatus configuration.

In the robot hand, when the first gear and the second gear rotate at the same number of revolutions, a rotation angle at which the first gear rotates and the first finger unit rotates and a rotation angle at which the second gear rotates and the second finger unit rotates may be equal to each other.

With this robot hand, the first finger unit including the first gear and the second finger unit including the second gear rotate at the same number of revolutions and at the same angle each other. Therefore, it is easy to perform posture control for an object. Compared with a configuration in which a rotation angle of the first gear and a rotation angle of the second gear are different when the first gear and the second gear rotate at the same number of revolutions, it is possible to simplify the apparatus configuration.

In the robot hand, the three or more finger units may include three finger units. The finger-unit moving mechanism may change a direction in which the opening and closing action of two finger units among the three finger units is performed.

With this robot hand, the direction in which the opening and closing action of the two finger units among the three finger units is performed is changed when the motor rotates. Therefore, it is possible to change, according to the shape of an object, a direction in which the three finger units grip the object. For example, when the object is a spherical body, the direction can be changed such that the three finger units wrap up the object (the three finger units are equally arranged around the object). On the other hand, when the object is a rod-like member, the direction can be changed such that the three finger units hold the object (the two finger units and the one finger unit are opposed to one another via the object). Therefore, it is possible to stably grip the spherical body and the rod-like member while holding down the number of arranged finger units to a necessary minimum.

In the robot hand, the three or more finger units may include four or more finger units.

With this robot hand, an object is gripped by the four or more finger units. Therefore, it is easy to stably grip the object in a predetermined position. It is also easy to grip a heavy object.

In the robot hand, the robot hand may include a coupling unit that couples to one ends of the three or more finger units. The driving unit may drive the coupling unit to thereby move the three or more finger units in synchronization with one another in a direction in which the finger units move close to one another or away from one another.

With this robot hand, it is easy to grip an object with the three or more finger units. Therefore, it is easy to stably grip the object in a predetermined position.

In the robot hand, a first coupling member that rotates in a direction same as the rotating direction of the first gear in association with the rotation of the worm may be provided in a portion of the first finger unit coupled to the coupling unit. A second coupling member that rotates in a direction same as the rotating direction of the second gear in association with the rotation of the worm may be provided in a portion of the second finger unit coupled to the coupling unit.

With this robot hand, the first finger unit and the second finger unit rotate in a state in which the finger units are coupled to the coupling unit. Therefore, the direction in which the opening and closing action of the first finger unit and the second finger unit is performed is stably changed.

In the robot hand, the coupling unit may be attached to a screw shaft and move along the screw shaft according to the driving by the driving unit. The first finger unit and the second finger unit may perform the opening and closing action when the first coupling member and the second coupling member move according to the movement of the coupling unit.

With this robot hand, it is possible to simultaneously perform a change of the direction in which the opening and closing action of the first finger unit and the second finger unit is performed and the opening and closing action of the first finger unit and the second finger unit. For example, this can be realized by driving the finger-unit moving mechanism while moving the coupling unit in the up down direction.

In the robot hand, a rotating shaft of the first gear and a rotating shaft of the first coupling member may be coaxial with each other. A rotating shaft of the second gear and a rotating shaft of the second coupling member may be coaxial with each other.

With this robot hand, the direction in which the opening and closing action of the first finger unit and the second finger unit is performed is stably changed. Compared with a configuration in which a rotating shaft of the first coupling member and a rotating shaft of the second coupling member are provided anew, it is possible to realize simplification of the apparatus configuration.

In the robot hand, the driving unit may move the three or more finger units close to one another from directions different from one another and move the three or more finger units away from one another in directions different from one another.

With this robot hand, the three or more finger units close toward the center without interfering with one another. Consequently, for example, even in griping a very small component, it is possible to stably grip the component.

In the robot hand, at least one finger unit among the three or more finger units may include a contact member including a bent section, a supporting member that rotatably supports the contact member in the bent section, and an elastic member that connects the contact member and the supporting member.

With this robot hand, it is possible to passively change, according to the position and the shape of an object, a portion where the finger unit comes into contact with the object. Consequently, since the most part of the finger unit can come into contact with the object, it is possible to stably grip the object. Even when the object slightly deviates from a predetermined position, the object to be gripped moves to the predetermined position in a process of closing of the finger unit. As a result, it is possible to stably grip the object.

In the robot hand, the contact member may be bent in a direction in which the finger unit closes.

With this robot hand, the contact member easily comes into contact with the object. Therefore, it is easy to stably grip the object in the predetermined position.

In the robot hand, at least one finger unit among the three or more finger units may include a stopper that regulates a rotation angle of rotation of the contact member.

With this robot hand, it is possible to temporarily stop the function of the elastic member. Consequently, it is possible to actively control force generated in the contact member according to driving force of the driving unit.

Another aspect of the invention is directed to a robot apparatus including the robot hand.

With this robot apparatus, it is possible to provide, simply and at low cost, a robot apparatus that can grip various objects including objects having dissimilar shapes and different sizes.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
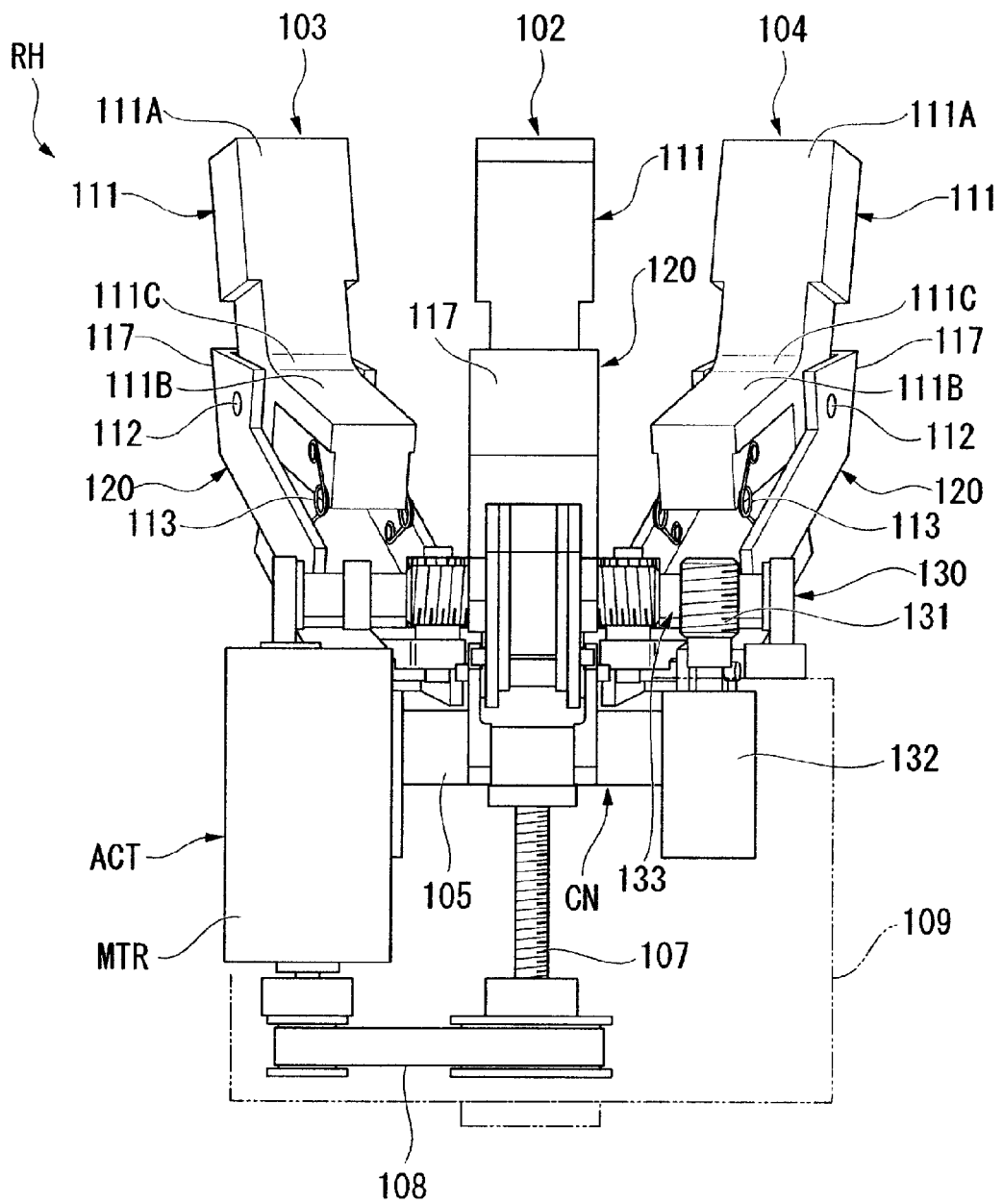
FIG. 1 is a side view showing an overall configuration of a robot hand according to a first embodiment of the invention.

Embodiments of the invention are explained below with reference to the accompanying drawings. The embodiments indicate aspects of the invention and do not limit the invention. The embodiments can be arbitrarily changed within the scope of the technical idea of the invention. In the drawings referred to below, to clearly show components, scales of the components, the numbers of the components, and the like in structures are different from those in actual structures.

In the following explanation, an XYZ Cartesian coordinate system shown in FIG. 1 is set. Members are explained with reference to the XYZ Cartesian coordinate system. In the XYZ Cartesian coordinate system, the X axis and the Y axis are set in directions in which the X axis and the Y axis are parallel to the horizontal plane and orthogonal to each other. The Z axis is set in a direction orthogonal to each of the X axis and the Y axis (the vertical direction).

First Embodiment

Figure 2:
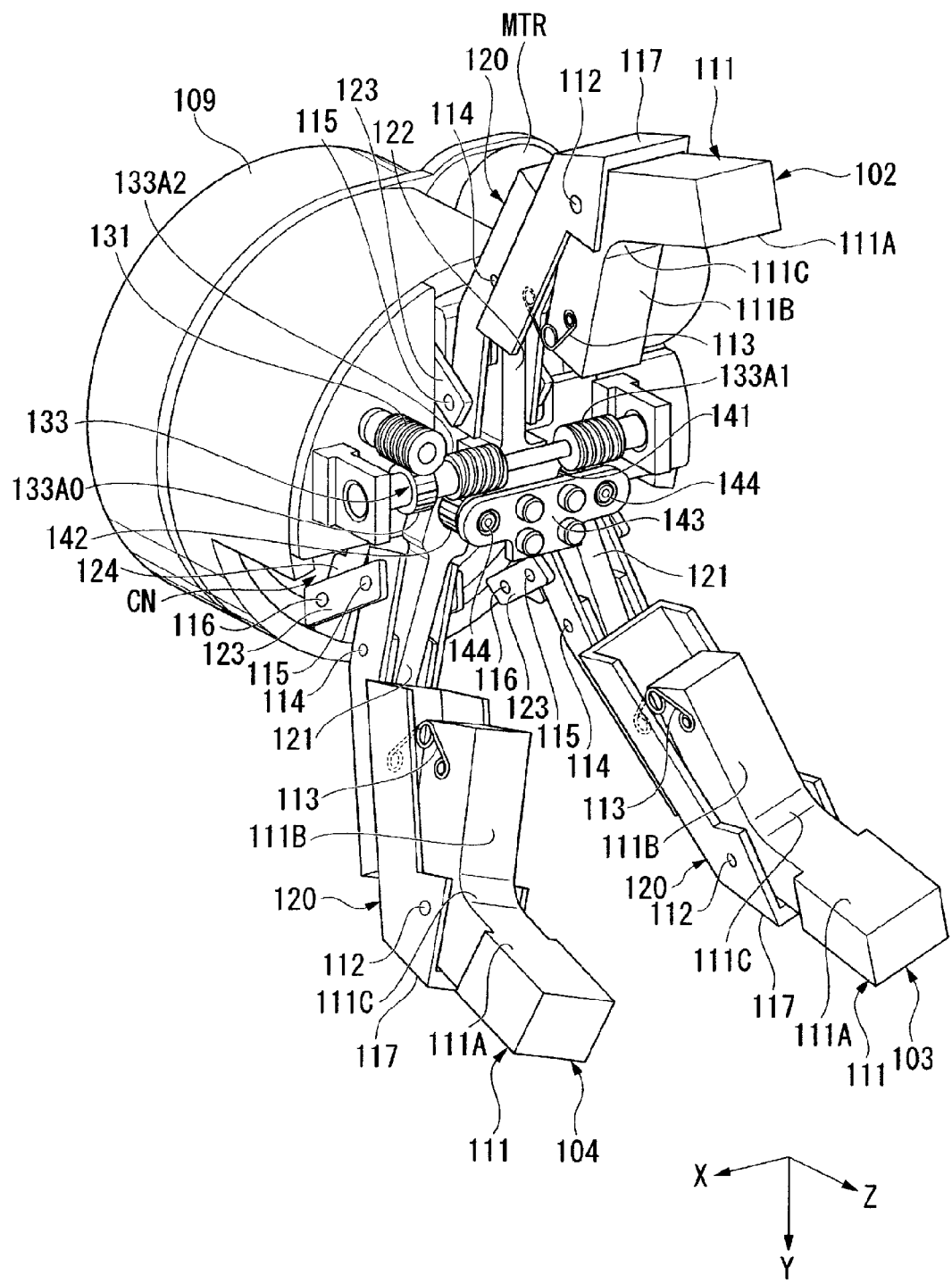
FIG. 2 is a perspective view showing the overall configuration of the robot hand according to the first embodiment.
Figure 3:
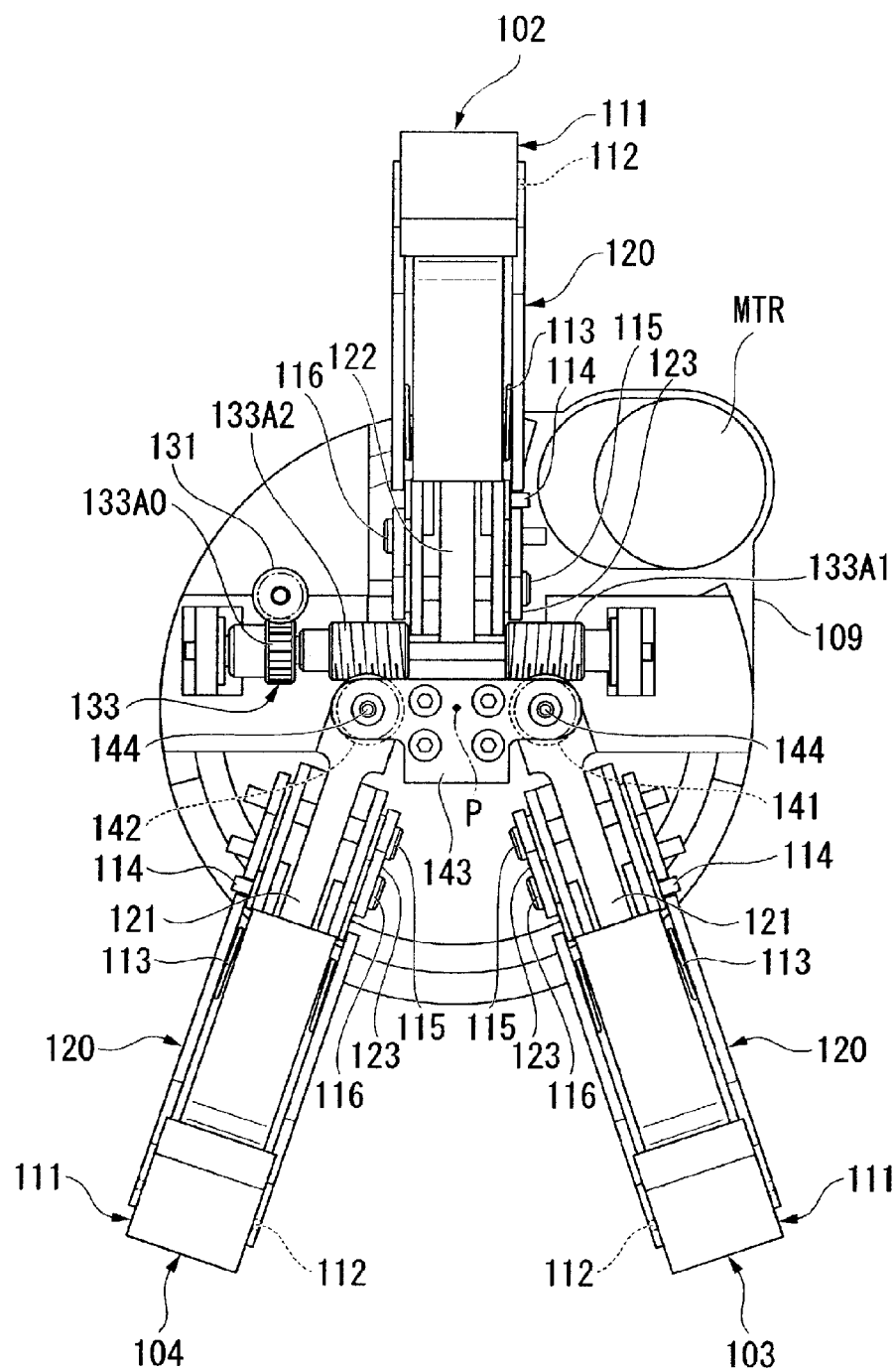
FIG. 3 is a plan view showing the overall configuration of the robot hand.
Figure 4:
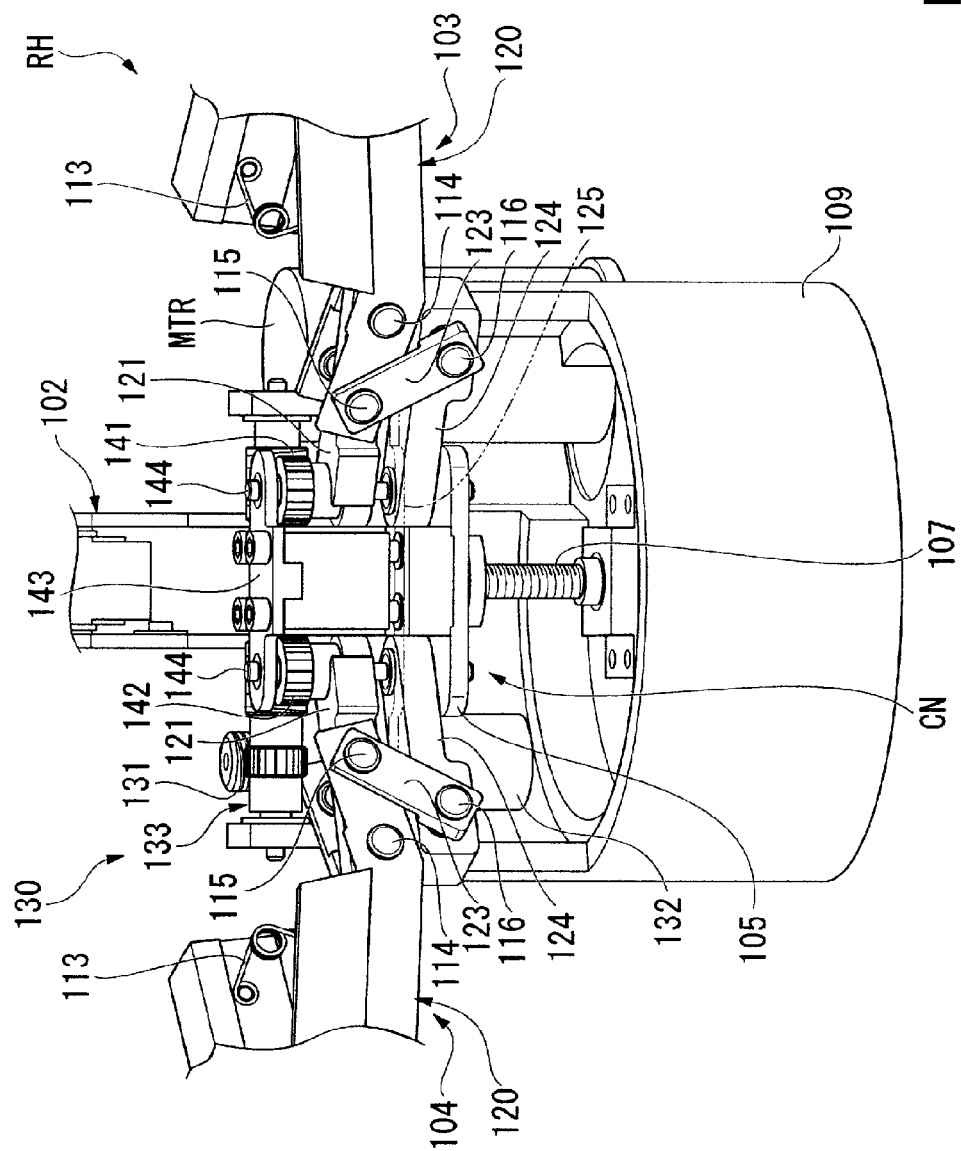
FIG. 4 is a partially enlarged view showing a coupling unit of the robot hand according to the first embodiment.

FIG. 1 is a side view showing an overall configuration of a robot hand RH according to a first embodiment of the invention. FIG. 2 is a perspective view showing the overall configuration of the robot hand RH. FIG. 3 is a plan view showing the overall configuration of the robot hand RH. FIG. 4 is a partially enlarged view showing a coupling unit CN of the robot hand RH.

As shown in FIG. 1, the robot hand RH includes three finger units 102 to 104 (a first finger unit 103, a second finger unit 104, and a third finger unit 102), a coupling unit CN that couples the finger units 102 to 104, a driving unit ACT that drives the coupling unit CN, a cover 109 that houses the coupling unit CN and the driving unit ACT, and a finger-unit moving mechanism 130 that changes a direction in which an opening and closing action of the first finger unit 103 and the second finger unit 104 is performed.

Concerning the first finger unit 103, the "direction in which the opening and closing operation is performed" means a direction in which the first finger unit 103 opens or closes on a surface that crosses a surface on which proximal end portions of the three finger units 102 to 104 (base portions on the opposite side of the distal ends of the finger units, for example, portions where gears are attached) are arranged and includes the center line of the first finger unit 103 (a line along the longitudinal direction of the first finger unit 103). Concerning the second finger unit 104, the "direction in which the opening and closing operation is performed" means a direction in which the second finger unit 104 opens or closes on a surface that crosses the surface on which the proximal end portions of the three finger units 102 to 104 are arranged and includes the center line of the second finger unit 104 (a line along the longitudinal direction of the second finger unit 104).

The robot hand RH is used as a gripping device of an industrial robot that grips objects such as a tool and a component. The robot hand RH is not limited to the use as the industrial robot and may be used for other applications (space related robots, play equipment, etc.).

The finger units 102 to 104 are sections that grip an object. The first finger unit 103 and the second finger unit 104 respectively include contact members 111, joint sections 112, supporting members 120, elastic members 113, and fixed members 121. A first gear 141 is attached to the proximal end portion of the fixed member 121 of the first finger unit 103. A second gear 142 is attached to the proximal end portions of the fixed member 121 of the second finger unit 104. The third finger unit 102 includes the contact member 111 that comes into contact with an object, the joint section 112, the supporting section 120 that rotatably supports the contact member 111, the elastic member 113, and a fixed member 122 that rotatably supports the supporting member 120. The fixed members 121 of the first finger unit 103 and the second finger unit 104 and the fixed member 122 of the third finger unit 102 have different shapes.

The contact member 111 is bent in a direction in which the finger unit closes. The contact member 111 is a rigid member formed in, for example, an L shape to include a bent section 111C. For example, a through-hole (not shown) is formed in the bent section 111C of the contact member 111. The joint section 112 having a shaft shape, both ends of which are fixed to the supporting member 120, is inserted through the through-hole. Consequently, the contact member 111 can rotate about the joint section 112. However, the configuration of the contact member 111 is not limited to this. In a configuration in which the through-hole is formed in a portion of the supporting member 120 overlapping the bent section 111C and both the ends of the shaft-shaped joint section 112, the center of which is fixed to the bent section 111C of the contact member 111, are inserted through the through-hole, the contact member 111 can rotate about the joint section 112.

Plural (two) contact sections (a first contact section 111A and a second contact section 111B) are provided in the contact member 111. The first contact section 111A and the second contact section 111B are sections that come into contact with an object. The first contact section 111A is provided between the bent section 111C and one end (the distal end side of the finger unit with respect to the bent section 111C) in the contact member 111. The second contact section 111B is provided between the bent section 111C and the other end (the proximal end side of the finger unit with respect to the bent section 111C) in the contact member 111.

The contact member 111 is provided to be capable of rotating about the joint section 112 in a direction in which the first contact section 111A comes into contact with the object and capable of rotating about the joint section 112 in a direction in which the second contact section 111B comes into contact with the object.

The elastic member 113 is connected between the contact member 111 and the supporting member 120. Specifically, one end of the elastic member 113 is connected to the second contact section 111B of the contact member 111. The other end of the elastic member 113 is connected to the supporting member 120. As the elastic member 113, for example, a spring can be used.

The supporting member 120 is a rigid member formed in, for example, an L shape. The supporting member 120 rotatably supports the contact member 111 in the bent section 111C via the joint section 112.

The fixed member 122 is a rigid member located at the proximal end of the third finger unit 102. The fixed member 122 rotatably supports the supporting member 120 of the third finger unit 102 via the joint section 114. For example, a through-hole (not shown) is formed in a portion of the fixed member 122 overlapping the supporting member 120. The joint section 114 having a shaft shape, both ends of which are fixed to the supporting member 120, is inserted through the through-hole. Consequently, the supporting member 120 can rotate about the joint section 114. However, the configuration of the supporting member is not limited to this. In a configuration in which the through-hole is formed in a portion of the supporting member 120 overlapping the fixed member 122 and both the ends of the shaft-shaped joint section 114, the center of which is fixed to the fixed member 122, are inserted through the through-hole, the supporting member 120 can rotate about the joint section 114.

The fixed member 121 is a rigid member located at the proximal end of the first finger unit 103 (the second finger unit 104). The fixed member 121 rotatably supports the supporting member 120 of the first finger unit 103 (the second finger unit 104) via the joint section 114. For example, a through-hole (not shown) is formed in a portion of the fixed member 121 overlapping the supporting member 120. The joint section 114 having a shaft shape, both ends of which are fixed to the supporting member 120, is inserted through the through-hole. Consequently, the supporting member 120 can rotate about the joint section 114. However, the configuration of the fixed member 121 is not limited to this. In a configuration in which the through-hole is formed in a portion of the supporting member 120 overlapping the fixed member 121 and both the ends of the shaft-shaped joint section 114, the center of which is fixed to the fixed member 121, are inserted through the through-hole, the supporting member 120 can rotate about the joint section 114.

In the finger units 102 to 104, stoppers 117 that regulate the rotation of the contact members 111 are provided. The stopper 117 is, for example, a section that projects to extend from the supporting member 120 to the first contact section 111A side of the contact member 111. The stopper 117 includes, for example, a function of regulating a rotation angle (a rotation angle of the rotation of the contact member 111 about the joint section 112) to prevent the contact member 111 from rotating a predetermined angle or more with respect to the joint section 112. For example, when the elastic member 113 is in natural length, the contact member 111 (a surface on the opposite side of the contact section 111A) is in contact with the stopper 117.

The coupling unit CN includes coupling plates 123, coupling members 124, joint sections 115 and 116, and a coupling substrate 105. The coupling plates 123 are, for example, tabular rigid members. Two coupling plates 123 are arranged to be opposed to each other across the supporting member 120. One ends of the coupling plates 123 are attached to the proximal end portion of the supporting member 120 via the joint section 115. The other ends of the coupling plates 123 are attached to the coupling member 124 via the joint section 116.

One end of the coupling plate 123 is rotatable about the joint section 115. For example, a through-hole (not shown) is formed in a portion of the supporting member 120 overlapping the coupling plate 123. The joint section 115 having a shaft shape, both ends of which are fixed to the coupling plate 123, is inserted through the through-hole. However, the configuration of the coupling plate 123 is not limited to this. The through-hole may be formed in a portion of the coupling plate 123 overlapping the supporting member 120 and both the ends of the shaft-shaped joint section 115, the center of which is fixed to the supporting member 120, may be inserted through the through-hole.

On the other hand, the other end of the coupling plate 123 is rotatable about the joint section 116. For example, a through-hole (not shown) is formed in a portion of the coupling member 124 overlapping the coupling plate 123. The joint section 116 having a shaft shape, both ends of which are fixed to the coupling plate 123, is inserted through the through-hole. However, the configuration of the coupling plate 123 is not limited to this. The through-hole may be formed in a portion of the coupling plate 123 overlapping the coupling member 124 and both the ends of the shaft-shaped joint section 116, the center of which is fixed to the coupling member 124, may be inserted through the through-hole. A portion of the coupling member 124 on the opposite side of a side where the joint section 116 is provided is rotatably attached to a rotating shaft 144 inserted through the coupling substrate 105 and a cover 143. The coupling substrate 105 is connected to the driving unit ACT.

The driving unit ACT includes a screw shaft 107 of a ball screw that is connected to a nut section of a ball screw included in the coupling substrate 105 and integrally lifts and lowers the coupling substrate 105, a driving unit MTR that drives the screw shaft 107, and a pulley 108 that transmits the rotation of the driving unit MTR.

The finger-unit moving mechanism 130 includes a worm wheel 131, a motor 132 that rotates the worm wheel 131, and a worm 133 that rotates in a direction different from a rotating direction of the worm wheel 131 in association with the rotation of the worm wheel 131. For example, the worm wheel 131 rotates about the Z axis according to the rotation of the motor 132. The worm 133 rotates about an axis orthogonal to a rotating shaft of the worm wheel 131 (a rotating shaft of the motor 132) (about the X axis) in association with the rotation of the worm wheel 131.

At the proximal end portion of the first finger unit 103 (the proximal end of the fixed member 121 of the first finger unit 103), the first gear 141 that rotates in a direction different from the rotating direction of the worm 133 in association with the rotation of the worm 133 is provided. At the proximal end portion of the second finger unit 104 (the proximal end of the fixed member 121 of the second finger unit 104), the second gear 142 that rotates in a direction opposite to the rotating direction of the first gear 141 in association with the rotation of the worm 133 is provided. For example, the first finger unit 103 rotates about the Z axis in association with the rotation of the worm 133. The second finger unit 104 rotates about the Z axis in association with the rotation of the worm 133 and rotates in a direction opposite to the rotating direction of the first finger unit 103. For example, the second finger unit 104 rotates counterclockwise about the Z axis when the first finger unit 103 rotates clockwise about the Z axis. The second finger unit 104 rotates clockwise about the Z axis when the first finger unit 103 rotates counterclockwise about the Z axis.

When the first gear 141 and the second gear 142 rotate at the same number of revolutions, a rotation angle at which the first gear 141 rotates and the first finger unit 103 rotates and a rotation angle at which the second gear 142 rotates and the second finger unit 104 rotates are equal to each other. In other words, the first finger unit 103 and the second finger unit 104 rotate by the same angle in directions opposite to each other about the Z axis at the same number of revolutions. If a pitch of the worm 133 is set different for the first finger unit 103 and the second finger unit 104, when the first gear 141 and the second gear 142 rotate at the same number of revolutions, the rotation angle at which the first gear 141 rotates and the first finger unit 103 rotates and the rotation angle at which the second gear 142 rotates and the second finger unit 104 rotate can be set different from each other. With this configuration, it is possible to grip an object having a special shape such as an asymmetrical object.

A space between the first gear 141 and the second gear 142 is kept fixed. The first gear 141 and the second gear 142 are held between the coupling substrate 105 and the cover 143 via the shaft 144 in a state in which the first gear 141 and the second gear 142 are respectively fixed to the proximal end portions of the fixed members 121.

For example, one end of the shaft 144 is inserted through the coupling substrate 105. The other end of the shaft 144 is fixed to the cover 143. Through-holes (not shown), through which the shaft 144 is inserted, are formed in the first gear 141, the second gear 142, and the fixed member 121. Consequently, the first gear 141, the second gear 142, and the fixed member 121, i.e., the first finger unit 103 and the second finger unit 104 can rotate about the shaft 144.

In the worm 133, spiral grooves 133A0, 133A1, and 133A2 are formed. A groove 133A0 is formed in a position where the worm 133 meshes with the worm wheel 131. A groove 133A1 is formed in a position where the worm 133 meshes with the first gear 141. A groove 133A2 is formed in a position where the worm 133 meshes with the second gear 142. The groove 133A1 and the groove 133A2 have shapes different from each other. For example, the groove 133A1 and the groove 133A2 have symmetrical shapes with respect to the center of the worm 133. Consequently, the first finger unit 103 and the second finger unit 104 respectively rotate in directions opposite to each other about the Z axis in association with the rotation of the worm 133. A rotation angle of the first finger unit 103 and a rotation angle of the second finger unit 104 are set equal to each other.

As shown in FIG. 3, the contact members 111 are arranged predetermined spaces apart from one another around a predetermined position P. For example, the contact members 111 are arranged on the same circumference around the predetermined position P. The contact members 111 respectively move close to the predetermined position P from different directions. The contact members 111 are configured such that the first contact section 111A and the second contact section 111B face the predetermined position P.

In FIG. 3, the contact members 111 are arranged on the same circumference around the predetermined position P. However, other configurations are also possible. In FIG. 3, the contact members 111 are arranged in positions shifted by different angles on the same circumference about the predetermined position P. However, the positions of the contact members 111 are not limited to these positions. For example, the contact members 111 may be arranged in positions rotated by an equal angle about the predetermined position P. This makes it easy to grasp a spherical object.

As shown in FIG. 4, the coupling member (a first coupling member) 124 that rotates in a direction same as the rotating direction of the first gear 141 in association with the rotation of the worm 133 is provided in a portion of the first finger unit 103 coupled to the coupling unit CN. The coupling member (a second coupling member) 124 that rotates in a direction same as the rotating direction of the second gear 142 in association with the rotation of the worm 133 is provided in a portion of the second finger unit 104 coupled to the coupling unit CN. For example, the coupling member 124 of the first finger unit 103 rotates clockwise about the Z axis when the first gear 141 rotates clockwise about the Z axis. The coupling member 124 of the second finger unit 104 rotates counterclockwise about the Z axis when the second gear 142 rotates counterclockwise about the Z axis.

The coupling unit CN moves in the up down direction along the screw shaft 107 according to the driving by the driving unit MTR. The first finger unit 103 and the second finger unit 104 performs the opening and closing action when the coupling members 124 move in the up down direction according to the movement in the up down direction of the coupling unit CN.

The rotating shaft of the first gear 141 and the rotating shaft of the coupling member 124 of the first finger unit 103 are coaxial with each other. The rotating shaft of the second gear 142 and the rotating shaft of the coupling member 124 of the second finger unit 104 are coaxial with each other.

Spacers 125 are provided between the fixed member 121 and the coupling member 124 of the first finger unit 103 and between the fixed member 121 and the coupling member 124 of the second finger unit 104. This makes it possible to smoothly change a direction in which the opening and closing action of the first finger unit 103 and the second finger unit 104 is performed.

One end of the spacer 125 is fixed to the coupling substrate 105. Therefore, the coupling member 124 of the first finger unit 103 and the coupling member 124 of the second finger unit 104 move in a state in which the coupling members 124 are held between the coupling substrate 105 and the spacer 125. In other words, the coupling member 124 of the first finger unit 103 and the coupling member 124 of the second finger unit 104 move in the up down direction integrally with the coupling substrate 105 and the spacers 125 according to the movement in the up down direction of the coupling unit CN.

Figure 5:
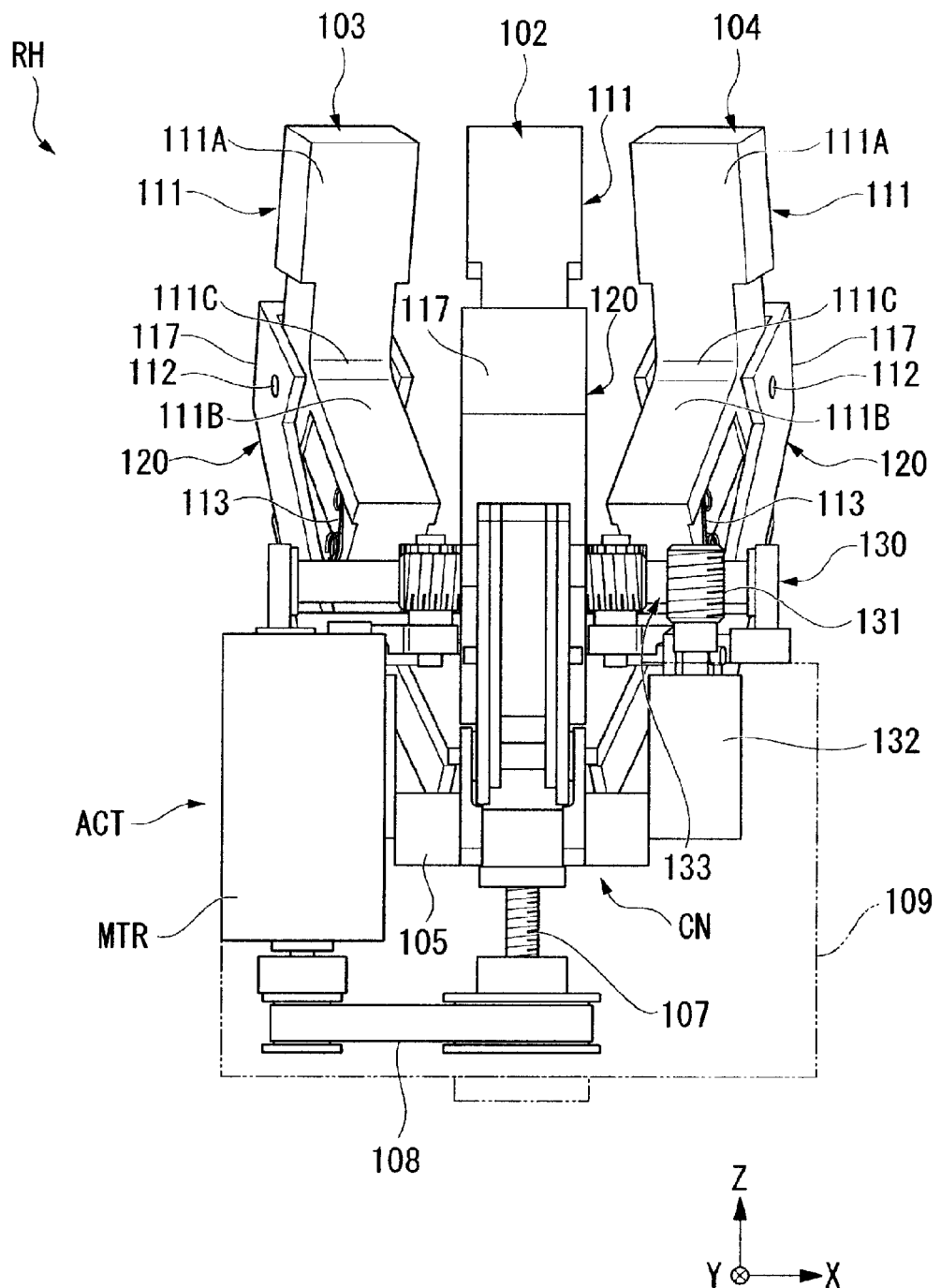
FIG. 5 is a diagram showing a state during the operation of the robot hand according to the first embodiment.
Figure 6:
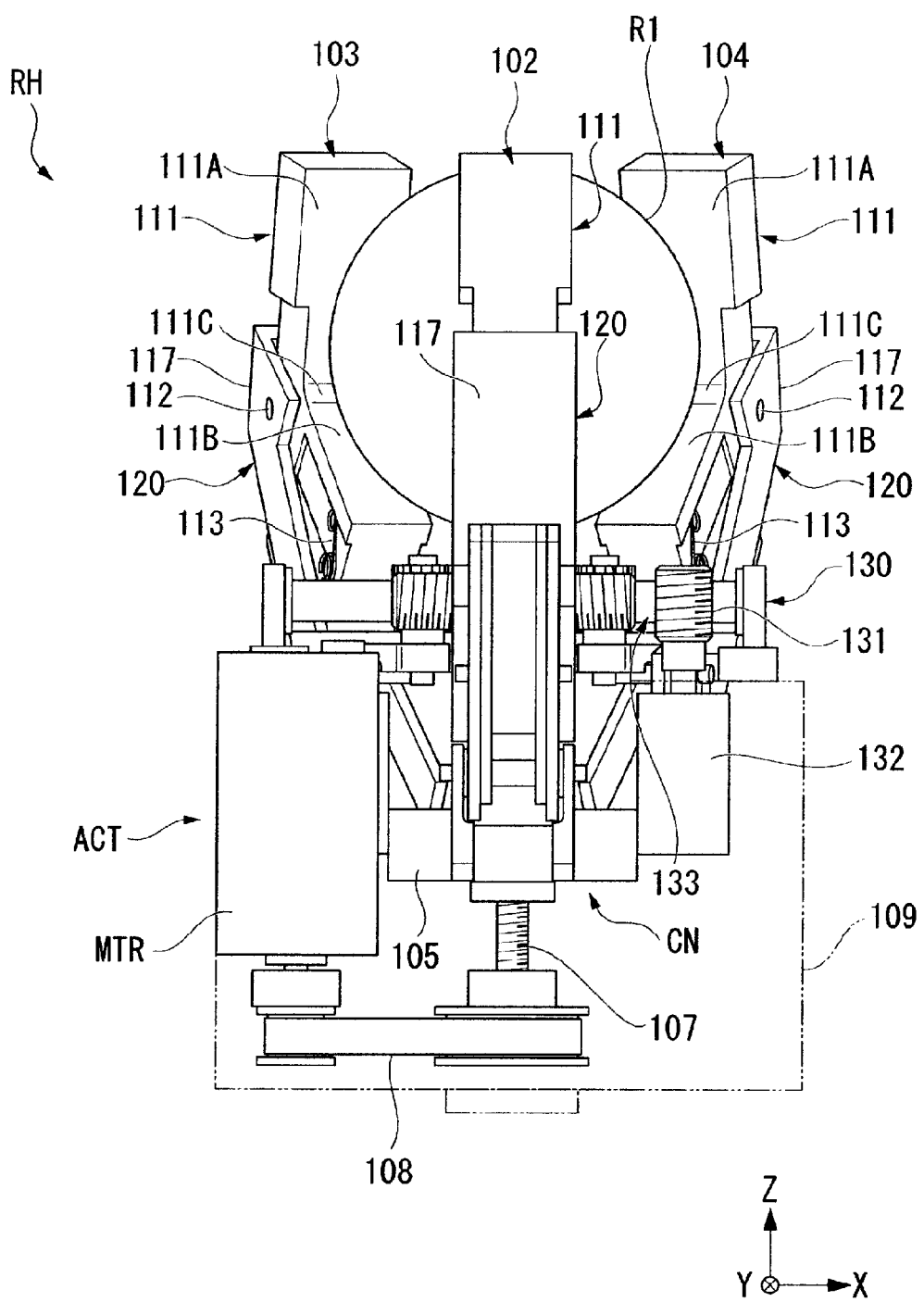
FIG. 6 is a diagram showing a state during the operation of the robot hand according to the first embodiment.

FIGS. 5 and 6 are diagrams showing a state during the operation of the robot hand RH. FIG. 5 shows a state in which the robot hand RH does not grip an object. FIG. 6 shows a state in which the robot hand RH grips a spherical body R1 as an object.

For example, as shown in FIG. 5, when the driving unit MTR rotates, the ball screw 107 rotates via the pulley 108. When the screw shaft 107 of the ball screw rotates, the coupling substrate 105 including the nut section of the ball screw moves up and down relatively to the screw shaft 107. The joint sections 116, the coupling plates 123, and the coupling members 124 move up and down according to the up and down movement of the coupling substrate 105 (see FIG. 2).

In the finger units 102 to 104, the proximal end portions of the supporting members 120 are respectively attached to the coupling substrate 105 via the coupling plates 123. Therefore, when the coupling substrate 105 moves up and down, the finger units 102 to 104 integrally rotate about the joint sections 114. For example, when the coupling substrate 105 moves downward, the finger units 102 to 104 move in synchronization with one another in a direction in which the finger units 102 to 104 move close to the predetermined position P (see FIG. 3). When the coupling substrate 105 moves upward, the finger units 102 to 104 move in synchronization with one another in a direction in which the finger units 102 to 104 move away from the predetermined position P.

When the finger units 102 to 104 move in synchronization with one another in the direction in which the finger units 102 to 104 move close to the predetermined position P, for example, if the second contact section 111B of the contact member 111 comes into contact with an object, moment acting with the joint section 112 as an axis is generated in the second contact section 111B. If the moment of the second contact section 111B acting with the joint section 112 as an axis is larger than moment of the elastic member 113 acting with the joint section 112 as an axis, the contact member 111 rotates about the joint section 112. If the moment of the second contact section 111B acting with the joint section 112 as an axis and the moment of the elastic member 113 acting with the joint section 112 as an axis are balanced, the rotation of the contact member 111 about the joint section 112 stops.

In this way, when the coupling substrate 105 moves up and down, the finger units 102 to 104 can be moved in synchronization with one another in the direction in which the finger units 102 to 104 move close to or away from the predetermined position P. For example, when an object R is arranged in the predetermined position P, the object R is gripped at least at three points by the contact members 111 of the finger units 102 to 104 according to the up and down movement of the coupling substrate 105.

When the finger units 102 to 104 are moved in a state in which the rotating motion of the contact members 111 is regulated by the stoppers 117, the elastic members 113 do not function. Therefore, torque generated by the driving unit MTR is controlled. Consequently, since force generated at the distal ends of the contact members 111 can be controlled, it is possible to actively control the force.

As shown in FIG. 6, the first contact section 111A and the second contact section 111B can simultaneously come into contact with an object R1. In this case, the rotating motion of the contact member 111 stops when resultant moment of moment generated when the first contact section 111A comes into contact with the object R1 (moment of the first contact section 111A acting with the joint section 112 as an axis), moment of the elastic member 113 acting with the joint section 112 as an axis, and moment generated when the second contact section 111B comes into contact with the object (moment of the second contact section 111B acting with the joint section 112 as an axis) is zero.

At this point, the object R1 and the finger units 102 to 104 are in contact at six points in total: points on the first contact section 111A (three points in the finger units 102 to 104) and points on the second contact section 111B (three points in the finger units 102 to 104). Consequently, frictional force between the object R1 and the three finger units 102 to 104 increases and the object R1 can be stably gripped.

Figure 7:
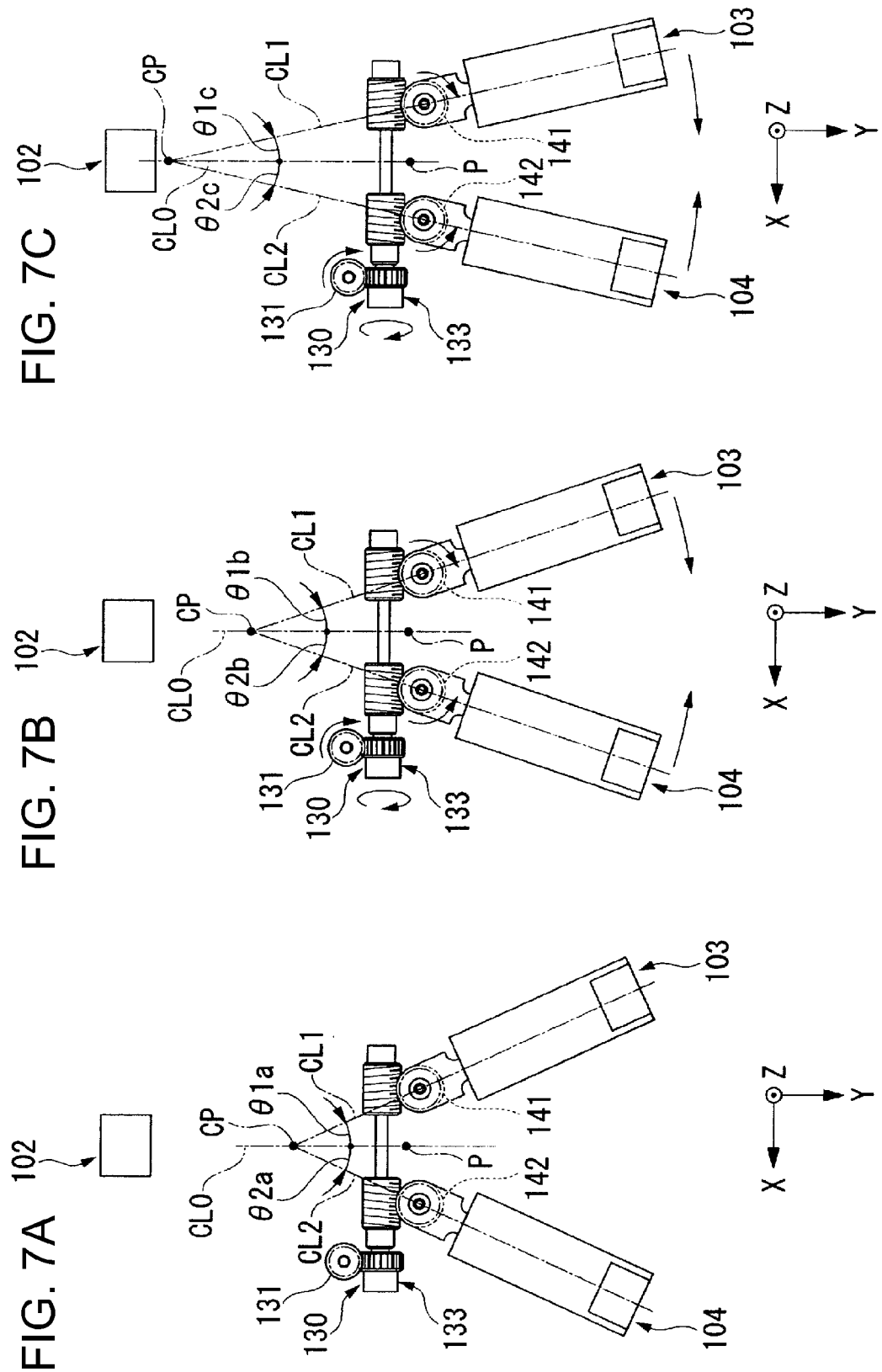
FIGS. 7A to 7C are plan views showing operation for changing a direction in which an opening and closing action of two finger units is performed according to the first embodiment.

FIGS. 7A to 7C are plan views showing operation for changing a direction in which the opening and closing action of the first finger unit 103 and the second finger unit 104 included in the robot hand RH is performed. In FIGS. 7A to 7C, operation for rotating the first finger unit 103 and the second finger unit 104 from a direction in which the finger units are away from each other to a direction in which the finger units move close to each other is explained as an example. In FIGS. 7A to 7C, reference sign CL0 denotes a center line between the first gear 141 and the second gear 142, CL1 denotes a center line of the first finger unit 103, CL2 denotes a center line of the second finger unit 104, P denotes a predetermined position, and CP denotes a crossing point of the center line CL1 of the first finger unit 103 and the center line CL2 of the second finger unit 104.

For example, as shown in FIG. 7A, during the start of the rotation of the motor 132, the distal end of the first finger unit 103 and the distal end of the second finger unit 104 are arranged in positions far from each other. At this point, a rotation angle $\theta 1a$ at which the first gear 141 rotates and the first finger unit 103 rotates (an angle formed by the center line CL0 and the center line CL1) and a rotation angle $\theta 2a$ at which the second gear 142 rotates and the second finger unit 104 rotates (an angle formed by the center line CL0 and the center line CL2) are equal to each other ($\theta 1a = \theta 2a$).

As shown in FIG. 7B, when the motor 132 is rotated, the worm wheel 131 rotates about the Z axis in synchronization with the rotation of the motor 132 and the worm 133 rotates about the X axis in association with the rotation of the worm wheel 131 about the Z axis. Then, the first gear 141 rotates clockwise about the Z axis in association with the rotation of the worm 133 about the X axis and the second gear 142 rotates counterclockwise about the Z axis in association with the rotation of the worm 133 about the X axis. At this point, a rotation angle $\theta 1b$ at which the first gear 141 rotates and the first finger unit 103 rotates and a rotation angle $\theta 2b$ at which the second gear 142 rotates and the second finger unit 104 rotates are respectively smaller than the rotation angles $\theta 1a$ and $\theta 2a$ during the start of the rotation of the motor 132 ($\theta 1b < \theta 1a$ and $\theta 2b < \theta 2a$). The rotation angle $\theta 1b$ and the rotation angle $\theta 2b$ are equal to each other ($\theta 1b = \theta 2b$). A distance between the crossing point CP and the predetermined position P is long compared with that during the start of the rotation of the motor 132.

As shown in FIG. 7C, when the motor 132 is further rotated, the first gear 141 further rotates clockwise about the Z axis in association with the rotation of the worm 133 about the X axis and the second gear 142 further rotates about the Z axis in association with the rotation of the worm 133 about the X axis. At this point, a rotation angle $\theta 1c$ at which the first gear 141 rotates and the first finger unit 103 rotates and a rotation angle $\theta 2c$ at which the second gear 142 rotates and the second finger unit 104 rotates are respectively smaller than the rotation angles $\theta 1b$ and $\theta 2b$ during the rotation of the motor 132 ($\theta 1c < \theta 1b$ and $\theta 2c < \theta 2b$). The rotation angle $\theta 1c$ and the rotation angle $\theta 2c$ are equal to each other ($\theta 1c = \theta 2c$). A distance between the crossing point CP and the predetermined position P is long compared with that during the rotation of the motor 132.

In this way, when the motor 132 is rotated, the two finger units 103 and 104 rotate from the direction in which the finger units are away from each other to the direction in which the finger units move close to each other. Consequently, for example, before the rotation of the motor 132, the finger units 102 to 104 can be opened at an equal space about the predetermined position P. After the rotation of the motor 132, the third finger unit 102, the first finger unit 103, and the second finger unit 104 can be opposed to one another across the predetermined position P (the first finger unit 103 and the second finger unit 104 are closed). Specifically, before the rotation of the motor 132, the rotation angles $\theta 1a$ and $\theta 2a$ are adjusted to 60 degrees. After the rotation of the motor 132, the rotation angles $\theta 1a$ and $\theta 2a$ are adjusted to 0 degree (the distance between the crossing point CP and the predetermined position P is adjusted to infinity). The space between the first gear 141 and the second gear 142 is always kept fixed before and after the rotation of the motor 132.

Figure 8:
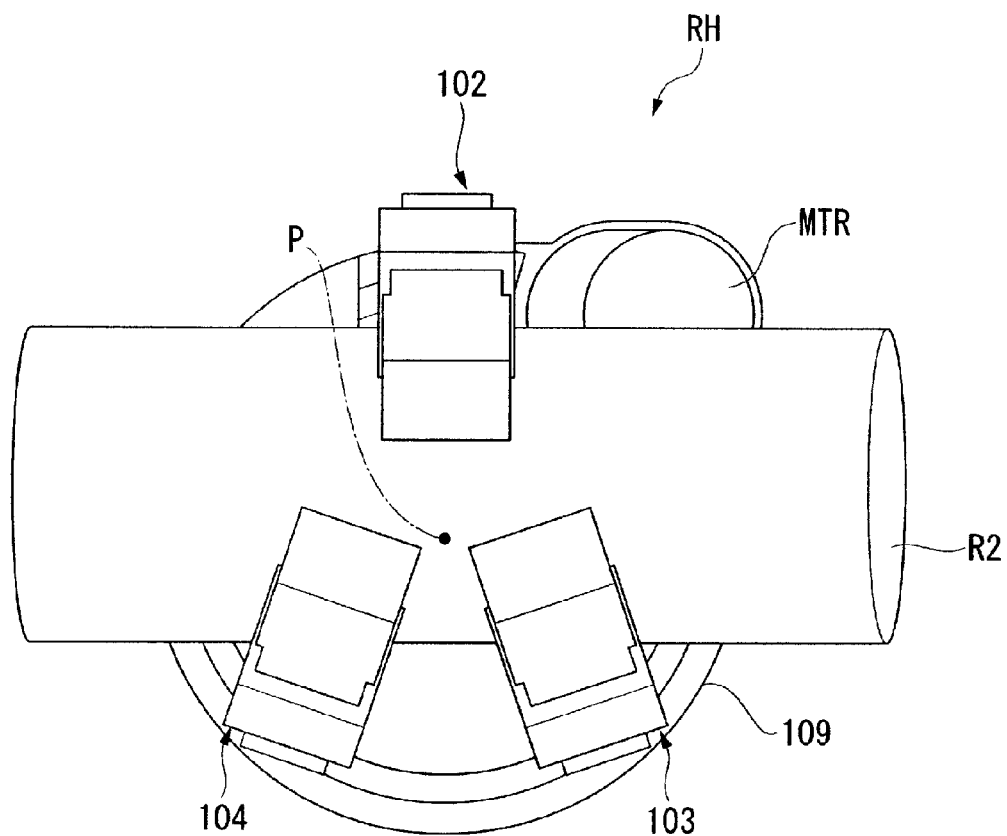
FIG. 8 is a diagram showing a state during the operation of the robot hand according to the first embodiment.

FIG. 8 is a diagram showing a state during the operation of the robot hand RH. FIG. 8 shows a state in which the robot hand RH grips a columnar member R2 as an object. Examples of the columnar member R2 include a tool having a columnar shape (e.g., a driver). When such a columnar member R2 is gripped, the tool R2 is arranged to pass through the center of the finger units 102 to 104. The third finger unit 102, the first finger unit 103, and the second finger unit 104 are set opposed to one another across the predetermined position P (the first finger unit 103 and the second finger unit 104 are closed). This makes it possible to stably grip the columnar member R2.

With the robot hand RH according to this embodiment, when the motor 132 rotates, the direction in which the opening and closing action of the first finger unit 103 and the second finger unit 104 among the three finger units is performed is changed. Therefore, a direction in which the finger units 102 to 104 grip an object can be changed according to the shape of the object. For example, when the object is a spherical body, the direction can be changed such that the finger units 102 to 104 wrap up the object (the finger units 102 to 104 are equally arranged around the object). On the other hand, when the object is a rod-like member, the direction can be changed such that the finger units 102 to 104 hold the object (the finger units 102 to 104 are opposed to each other via the object). The robot hand RH can stably grip the spherical body and the rod-like member according to the change of the direction in which the opening and closing action of such finger units is performed. Therefore, it is possible to provide the robot hand RH that can grip various objects including objects having dissimilar shapes and different sizes. A combined mechanism of the worm wheel 131 and the worm 133 (a worm gear mechanism) is adopted and the cam follower mechanism is unnecessary. Therefore, it is possible to adopt simple structure and realize a reduction in cost.

With this configuration, the first finger unit 103 including the first gear 141 and the second finger unit 104 including the second gear 142 respectively rotate in fixed positions. Therefore, compared with a configuration in which the space between the rotating shaft of the first gear and the rotating shaft of the second gear fluctuates, it is possible to realize simplification of the apparatus configuration.

With this configuration, the first finger unit 103 including the first gear 141 and the second finger unit 104 including the second gear 142 rotate at the same number of revolutions and at the same angle each other. Therefore, it is easy to perform posture control for an object. Compared with a configuration in which a rotation angle of the first gear and a rotation angle of the second gear are different when the first gear and the second gear rotate at the same number of revolutions, it is possible to simplify the apparatus configuration.

With this configuration, the direction in which the opening and closing action of the two finger units 103 and 104 among the three finger units 102 to 104 is performed is changed when the motor 132 rotates. Therefore, it is possible to change, according to the shape of an object, a direction in which the three finger units 102 to 104 grip the object. For example, when the object is a spherical body, the direction can be changed such that the three finger units 102 to 104 wrap up the object (the three finger units 102 to 104 are equally arranged around the object). On the other hand, when the object is a rod-like member, the direction can be changed such that the three finger units 102 to 104 hold the object (the two finger units 103 and 104 and the one finger unit 102 are opposed to one another via the object). Therefore, it is possible to stably grip the spherical body and the rod-like member while holding down the number of arranged finger units to a necessary minimum.

With this configuration, the robot hand RH includes the coupling unit CN and the driving unit MTR drives the coupling unit CN to thereby move the three finger units 102 to 104 in the direction in which the finger units move close to one another or move away from one another in synchronization with one another. This makes it easy to grip an object with the three finger units 102 to 104. Therefore, it is easy to stably grip the object in a predetermined position.

With this configuration, the first finger unit 103 and the second finger unit 104 rotate in a state in which the finger units are coupled to the coupling unit CN. Therefore, the direction in which the opening and closing action of the first finger unit 103 and the second finger unit 104 is performed is stably changed.

With this configuration, it is possible to simultaneously perform a change of the direction in which the opening and closing action of the first finger unit 103 and the second finger unit 104 is performed and the opening and closing action of the first finger unit 103 and the second finger unit 104. For example, this can be realized by driving the finger-unit moving mechanism 130 while moving the coupling unit CN in the up down direction.

With this configuration, the rotating shafts of the gears and the rotating shafts of the coupling members are coaxial with each other. Therefore, the direction in which the opening and closing action of the first finger unit 103 and the second finger unit 104 is performed is stably changed. Compared with a configuration in which a rotating shaft of the first coupling member and a rotating shaft of the second coupling member are provided anew, it is possible to realize simplification of the apparatus configuration.

With this configuration, the driving unit MTR moves the three finger units 102 to 104 close to one another from directions different from one another and moves the three finger units 102 to 104 away from one another in directions different from one another. Therefore, the three finger units 102 to 104 close toward the center without interfering with one another.

Consequently, for example, even in griping a very small component, it is possible to stably grip the component.

With this configuration, the finger units 102 to 104 include the contact members 111, the supporting members 120, and the elastic members 113. Therefore, it is possible to passively change, according to the position and the shape of an object, portions where the finger units 102 to 104 come into contact with the object. Consequently, since the most part of the finger units 102 to 104 can come into contact with the object, it is possible to stably grip the object. Even when the object slightly deviates from a predetermined position, the object moves to the predetermined position P in a process of closing of the finger units 102 to 104. As a result, it is possible to stably grip the object.

With this configuration, the contact member 111 is bent in a direction in which the finger unit closes. Therefore, the contact member 111 easily comes into contact with the object. Therefore, it is easy to stably grip the object in the predetermined position.

With this configuration, the finger units 102 to 104 include the stoppers 117. Therefore, it is possible to temporarily stop the function of the elastic member 113. Consequently, it is possible to actively control force generated in the contact member 111 according to driving force of the driving unit MTR.

In this embodiment, the direction in which the opening and closing action of the two finger units 103 and 104 among the three finger units 102 to 104 is performed is changed by the finger-unit moving mechanism 130. However, the configuration of the finger units 102 to 104 is not limited to this. For example, a direction in which the opening and closing action of all the three finger units 102 to 104 is performed may be changed by the finger-unit moving mechanism 130. Specifically, this can be realized by also providing, in the third finger unit 102, a gear that rotates in a direction different from the rotating direction of the worm in association with the rotation of the worm.

In this embodiment, the finger units 102 to 104 include the stoppers 117. However, the configuration of the finger units 102 to 104 is not limited to this. For example, the stoppers 117 may not be provided in the finger units 102 to 104. The stoppers 117 may not be provided only in a part of the three or more finger units. With such a configuration, the components are reduced because the stoppers 117 are not provided. It is possible to realize a reduction in cost.

Second Embodiment

Figure 9:
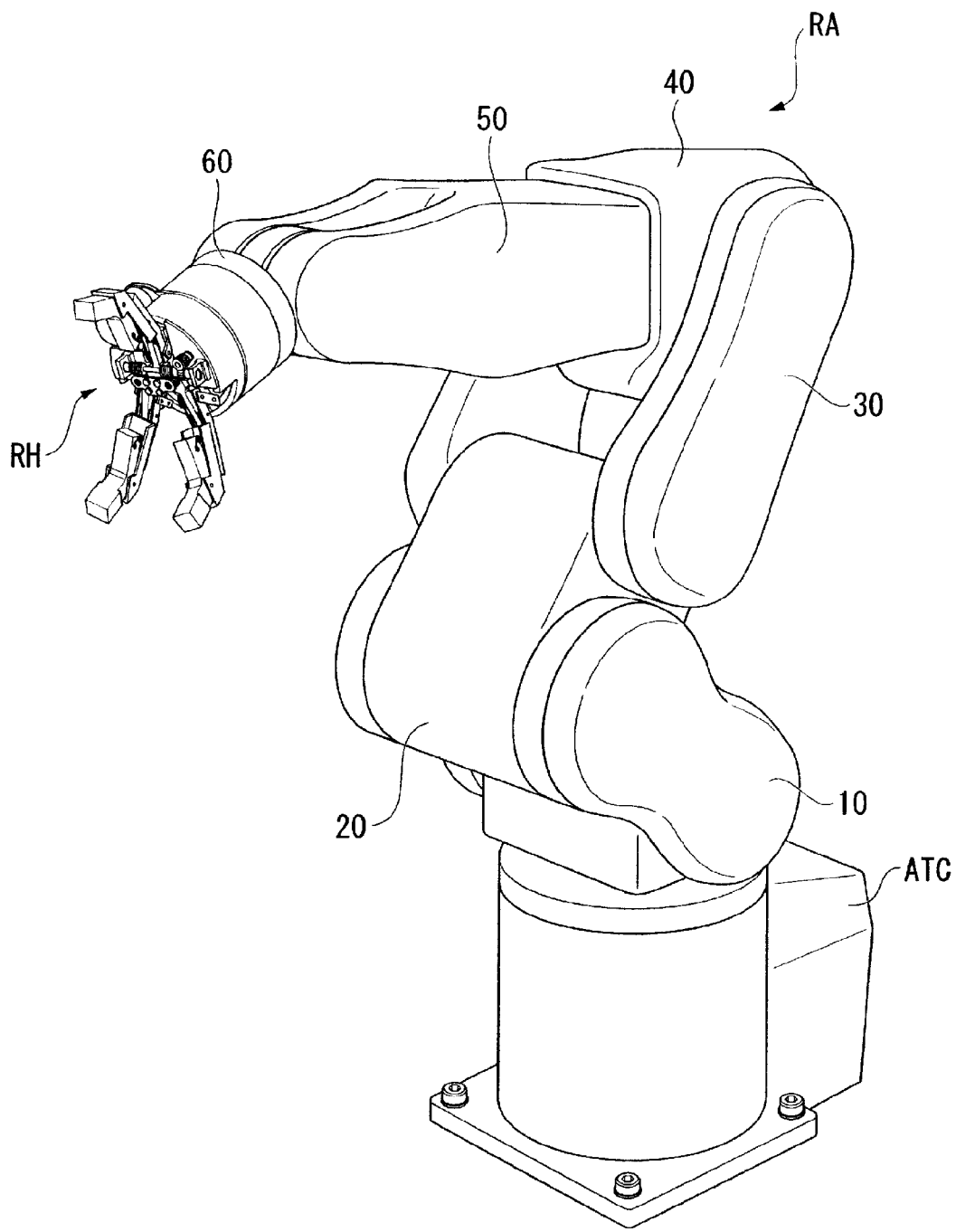
FIG. 9 is a diagram showing an overall configuration of a robot apparatus according to a second embodiment of the invention.

FIG. 9 is a perspective view showing the configuration of a robot apparatus RA according to a second embodiment.

As shown in FIG. 9, the robot apparatus RA is used as, for example, an industrial robot arm. The robot apparatus RA includes an attaching section ATC, a first joint 10, a second joint 20, a third joint 30, a fourth joint 40, a fifth joint 50, and a sixth joint 60.

The attaching section ATC is a section attached to, for example, the floor, the wall, the ceiling, or the like. For example, the first to sixth joints 10 to 60 are connected in series in order from the attaching section ATC. For example, the first to sixth joints 10 to 60 are respectively connected to the joints adjacent thereto via rotating shafts and are provided to be capable of rotating about the rotating shafts. Since each of the first to sixth joints 10 to 60 is rotatably provided, it is possible to perform complex operation of the entire robot arm RA by appropriately rotating the respective joints.

The sixth joint 60 is the distal end portion of the robot apparatus RA. The robot hand RH described in the first embodiment is attached to the distal end portion of the sixth joint 60.

With the robot apparatus RA according to this embodiment, it is possible to provide, simply and at low cost, the robot apparatus RA that can grip various objects including objects having dissimilar shapes and different sizes.

Modification

Figure 10A:
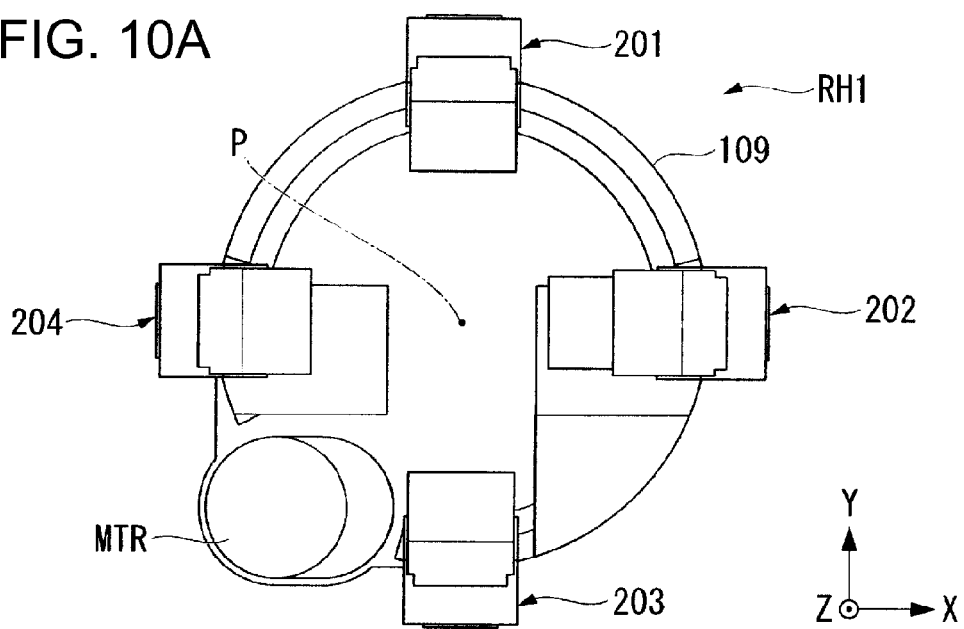
FIGS. 10A and 10B are diagrams showing a modification of a robot hand.
Figure 10B:
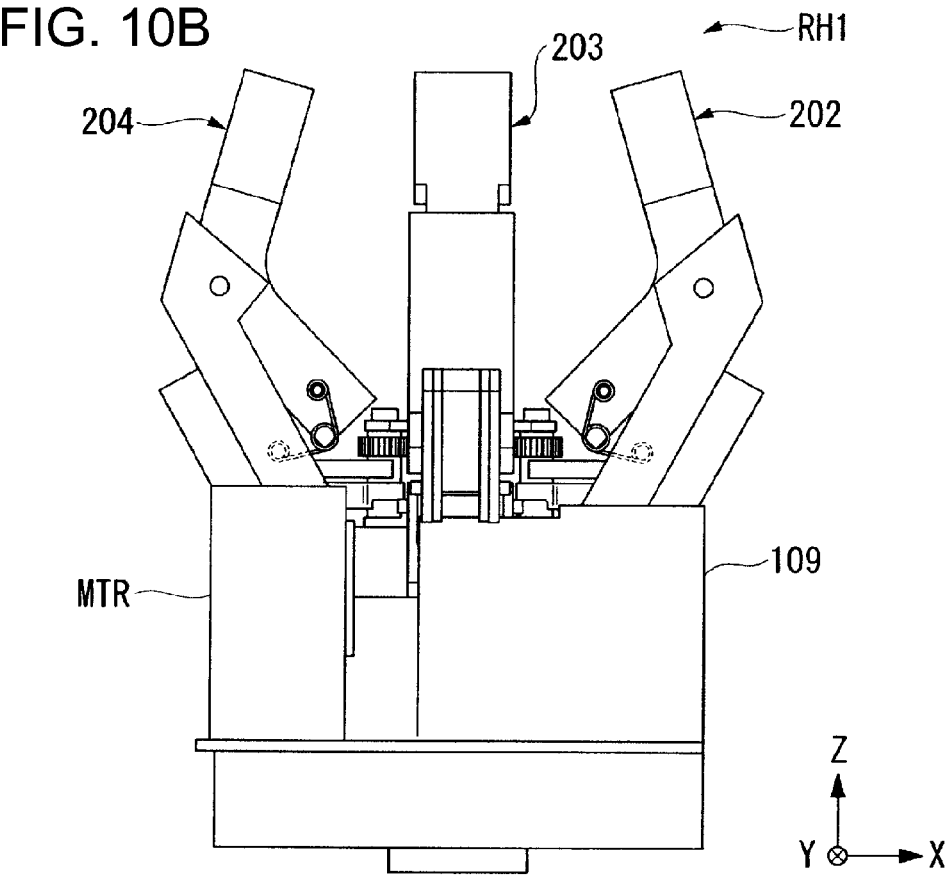

FIGS. 10A and 10B are diagrams showing a modification of the robot hand according to the invention. FIG. 10A is a plan view showing a robot hand RH1 according to this modification. FIG. 10B is a side view showing the robot hand RH1 according to this modification. In FIGS. 10A and 10B, the finger-unit moving mechanism is not shown for convenience of illustration.

The robot hand RH1 according to this modification is different from the robot hand RH explained in the first embodiment in that four finger units are provided. The other components are the same as those of the robot hand RH explained in the first embodiment. Therefore, detailed explanation of the components is omitted.

As shown in FIGS. 10A and 10B, four finger units 201 to 204 are arranged to face the predetermined position P. The four finger units 201 to 204 are arranged in positions each rotated by 90 degrees with respect to the predetermined position P, i.e., the positions of the four vertexes of a square. The arrangement of the four finger units 201 to 204 is not limited to this. For example, the four finger units 201 to 204 may be arranged in the positions of the four vertexes of a rectangle or may be arranged in the positions of the vertexes of another square (e.g., a parallelogram, a rhombus, or a trapezoid).

With the robot hand RH1 according to this modification, the four finger units 201 to 204 grip an object. Therefore, it is easy to stably grip the object in a predetermined position. It is also easy to grip a heavy object. Further, it is easy to stably grip a slim object, a thin object, and an elastic member. On the other hand, in the case of the three finger units, when a slim object, a thin object, or an elastic member is gripped, the object sometimes bends. In the case of the three finger units, completely different portions are supported at three points. However, in the case of the four finger units, the object is supported only in two pairs of places. Therefore, an object having a shape that cannot be supported at three points (e.g., a slim stepped shaft excessively narrowed in the center) can also be gripped.

Figure 11:
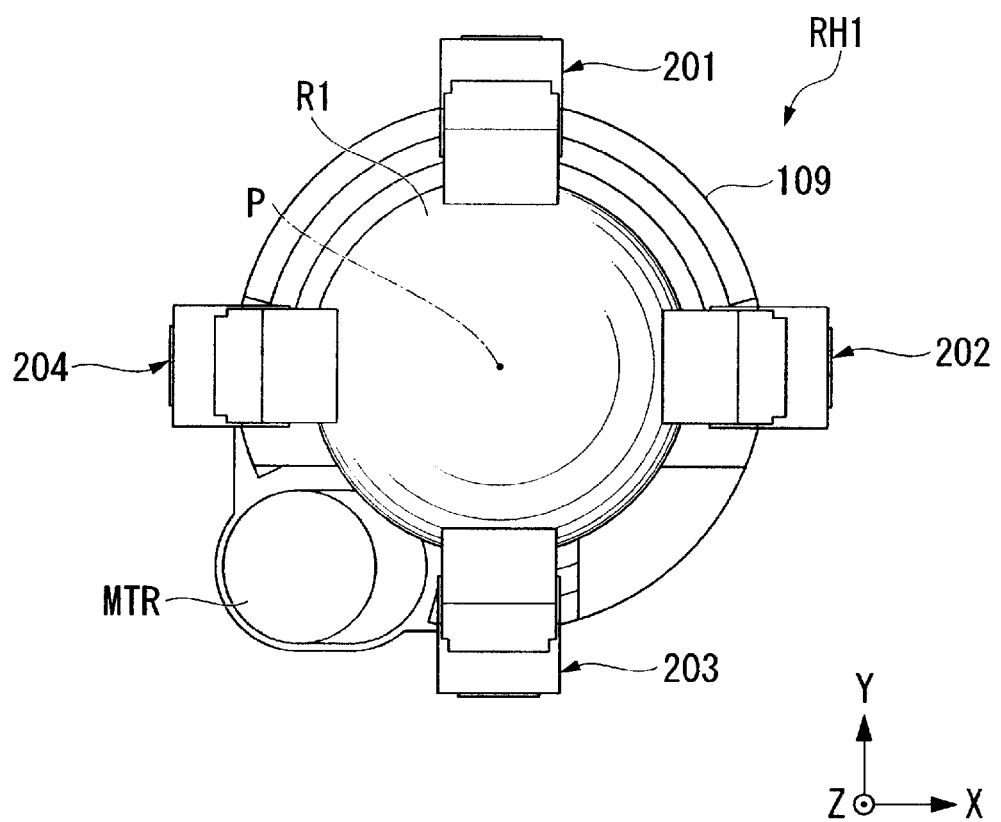
FIG. 11 is a diagram showing a state during the operation of the robot hand according to the modification.
Figure 12:
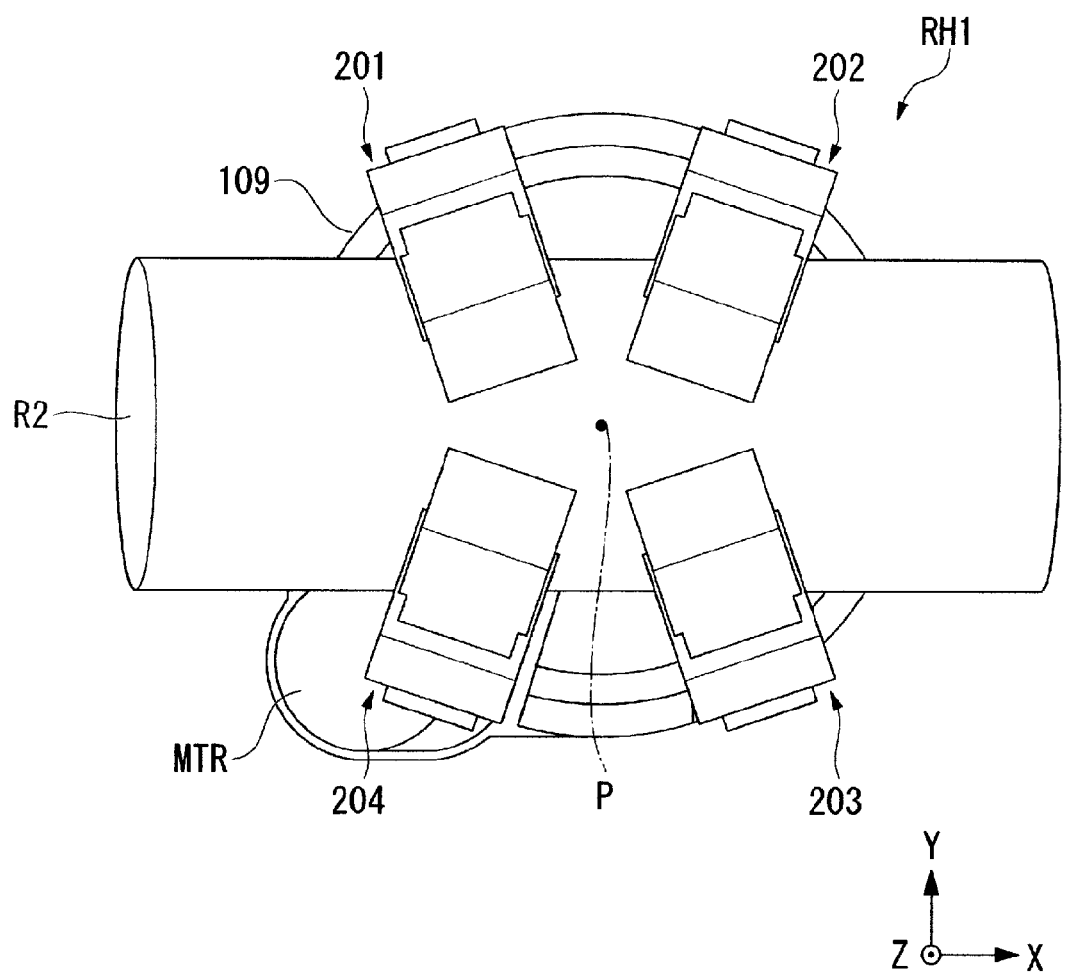
FIG. 12 is a diagram showing a state during the operation of the robot hand according to the modification.

FIGS. 11 and 12 are diagrams showing a state during the operation of the robot hand RH1. FIG. 11 shows a state in which the robot hand RH1 grips a spherical body R1 as an object. FIG. 12 shows a state in which the robot hand RH1 grips a columnar member R2 as an object. Examples of the columnar member R2 include a tool having a columnar shape (e.g., a driver), a material having a columnar shape (e.g., a slim wire material, a piping tube of rubber or resin, or an electric wire). The object may be a tabular member (e.g., a thin plate) instead of the columnar member.

As shown in FIG. 11, when the spherical body R1 is gripped, the four finger units 201 to 204 are arranged in positions each rotated 90 degrees with respect to the predetermined position P. The first finger unit 201 and the third finger unit 203 are set to be opposed to each other and the second finger unit 202 and the fourth finger unit 204 are set to be opposed to each other across the predetermined position P. This makes it possible to stably hold the object.

As shown in FIG. 12, when the columnar member R2 is gripped, the tool R2 is arranged to pass through the center of the finger units 201 to 204. The first finger unit 201 and the fourth finger unit 204 are set to be opposed to each other and the second finger unit 202 and the third finger unit 203 are set to be opposed to each other across the predetermined position P (the first finger unit 201 and the second finger unit 202 are closed and the third finger unit 203 and the fourth finger unit 204 are closed). This makes it possible to stably hold the object.

Figure 13:
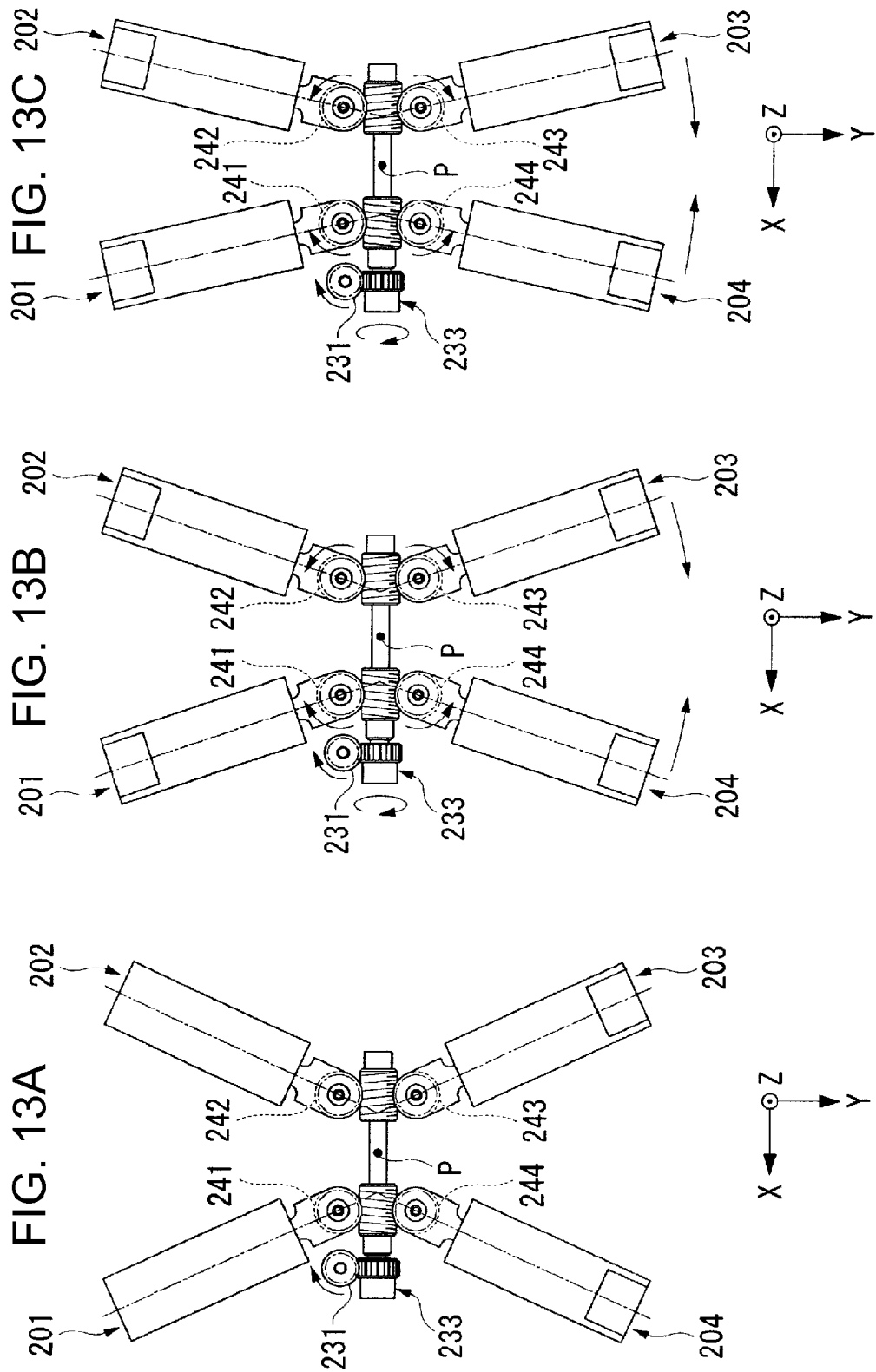
FIGS. 13A to 13C are plan views showing operation for changing a direction in which four finger units perform an opening and closing operation according to the modification.

FIGS. 13A to 13C are plan views showing operation for changing a direction in which an opening and closing action of the first finger unit 201, the second finger unit 202, the third finger unit 203, and the fourth finger unit 204 included in the robot hand RH1 (simultaneous driving of the four fingers) is performed. In FIGS. 13A to 13C, the operation performed when the first finger unit 201 and the second finger unit 202 (the third finger unit 203 and the fourth finger unit 204) rotate from a direction in which the finger units are apart from each other to a direction in which the finger units move close to each other is explained as an example.

For example, as shown in FIG. 13A, during the start of the rotation of a motor, the distal end of the first finger unit 201 and the distal end of the second finger unit 202 are arranged in positions far from each other. On the other hand, the distal end of the third finger unit 203 and the distal end of the fourth finger unit 204 are also arranged in positions far from each other.

As shown in FIG. 13B, when the motor is rotated, a worm wheel 231 rotates and a worm 233 rotates in association with the rotation of the worm wheel 231. Then, a first gear 241 rotates clockwise about a rotating shaft thereof in association with the rotation of the worm 233 and a second gear 242 rotates counterclockwise about a rotating shaft thereof in association with the rotation of the worm 233. On the other hand, a third gear 243 rotates clockwise about a rotating shaft thereof in association with the rotation of the worm 233 and a fourth gear 244 rotates counterclockwise about a rotating shaft thereof in association with the rotation of the worm 233.

As shown in FIG. 13C, when the motor is further rotated, the first gear 241 further rotates clockwise about the rotating shaft in association with the rotation of the worm 233 and the second gear 242 further rotates counterclockwise about the Z axis in association with the rotation of the worm 233. On the other hand, the third gear 243 further rotates clockwise about the rotating shaft in association with the rotation of the worm 233 and the fourth gear 244 further rotates counterclockwise about the Z axis in association with the rotation of the worm 233.

In this way, when the motor is rotated, the two finger units 201 and 202 (the two finger units 203 and 204) rotate from the direction in which the finger units are apart from each other to the direction in which the finger units move close to each other. Consequently, for example, before the rotation of the motor, the finger units 201 to 204 can be arranged an equal space apart from one another about the predetermined position P. After the rotation of the motor, the first finger unit 201 and the fourth finger unit 204 can be set opposed to each other across the predetermined position P and the second finger unit 202 and the third finger unit 203 can be set opposed to each other across the predetermined position P (the first finger unit 201 and the second finger unit 202 are closed and the third finger unit 203 and the fourth finger unit 204 are closed).

Figure 14:
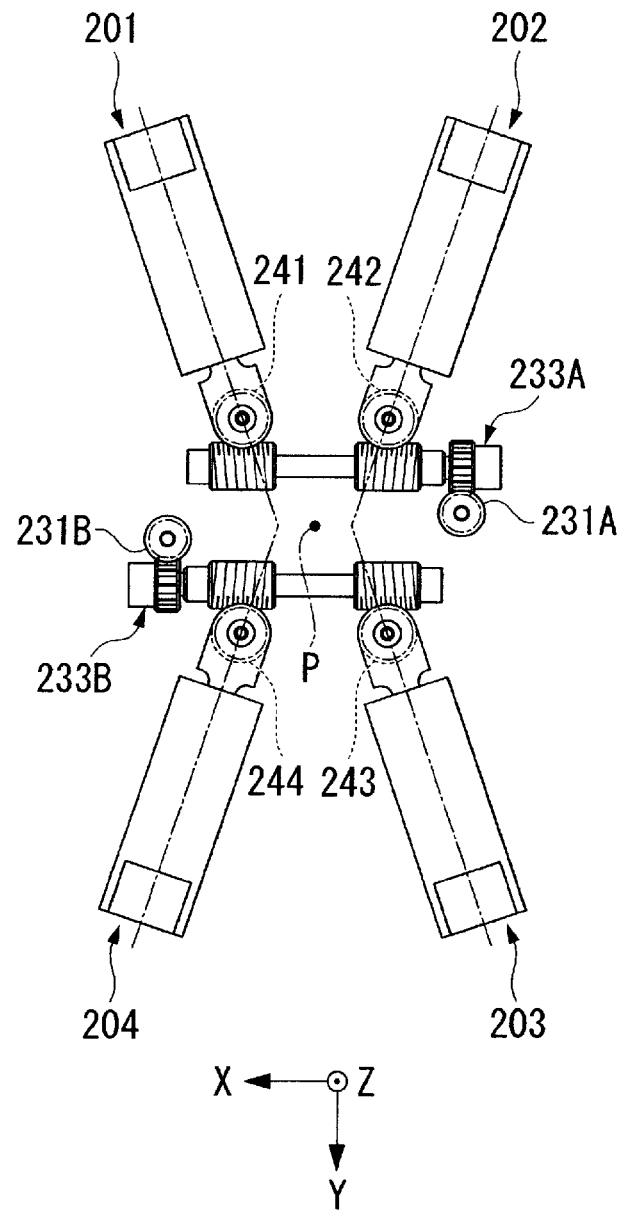
FIG. 14 is a plan view showing the operation for changing the direction in which the opening and closing action of the four finger units is performed according to the modification.

FIG. 14 is a plan view showing operation for changing the direction in which the opening and closing action of the first finger unit 201, and the second finger unit 202, the third finger unit 203, and the fourth finger unit 204 included in the robot hand RH1 is performed (independent driving for each two fingers).

As shown in FIG. 14, the first finger unit 201 and the second finger unit 202 can be rotated by a first worm wheel 231A and a first worm 233A. The third finger unit 203 and the fourth finger unit 204 can be rotated by a second worm wheel 231B and a second worm 233B. Consequently, the first and second finger units 201 and 202 and the third and fourth finger units 203 and 204 can be independently driven separately.

In this modification, the configuration of the robot hand RH1 including the four finger units 201 to 204 is explained as an example. However, the configuration of the robot hand RH1 is not limited to this. For example, a robot hand may include five or more finger units. With this configuration, it is easy to grip a heavier object.

The entire disclosure of Japanese Patent Application No. 2011-028574, filed Feb. 14, 2011 is expressly incorporated by reference herein.

What is claimed is:

1. A robot hand comprising:
   three or more finger units including a first finger unit and a second finger unit;
   a driving unit that causes the three or more finger units to perform an opening and closing action; and
   a finger-unit moving mechanism that changes a direction in which the opening and closing action of the first finger unit and the second finger unit is performed, wherein
   the finger-unit moving mechanism includes:
      a worm wheel;
      a motor that rotates the worm wheel; and
      a worm that rotates in a direction different from a rotating direction of the worm wheel in association with the rotation of the worm wheel,
   a first gear that rotates in a direction different from the rotating direction of the worm in association with the rotation of the worm is provided in the first finger unit and a second gear that rotates in a direction opposite to the rotating direction of the first gear in association with the rotation of the worm is provided in the second finger unit,
   the first finger unit and the second finger unit rotate, when the motor rotates, in a direction in which the finger units move close to each other or a direction in which the finger units move away from each other, and
   when the first gear and the second gear rotate at a same number of revolutions, a rotation angle at which the first gear rotates and the first finger unit rotates and a rotation angle at which the second gear rotates and the second finger unit rotates are equal to each other.

2. The robot hand according to claim 1, wherein a space between a rotating shaft of the first gear and a rotating shaft of the second gear is kept fixed.

3. The robot hand according to claim 1, wherein
   the three or more finger units include three finger units, and
   the finger-unit moving mechanism changes a direction in which the opening and closing action of two finger units among the three finger units is performed.

4. The robot hand according to claim 1, wherein the three or more finger units include four or more finger units.

5. The robot hand according to claim 1, further comprising a coupling unit that couples to one ends of the three or more finger units, wherein
   the driving unit drives the coupling unit to thereby move the three or more finger units in synchronization with one another in a direction in which the finger units move close to one another or away from one another.

6. The robot hand according to claim 5, wherein a first coupling member that rotates in a direction same as the rotating direction of the first gear in association with the rotation of the worm is provided in a portion of the first finger unit coupled to the coupling unit and a second coupling member that rotates in a direction same as the rotating direction of the second gear in association with the rotation of the worm is provided in a portion of the second finger unit coupled to the coupling unit.

7. The robot hand according to claim 6, wherein
   the coupling unit is attached to a screw shaft and moves along the screw shaft according to the driving by the driving unit, and
   the first finger unit and the second finger unit perform the opening and closing action when the first coupling member and the second coupling member move according to the movement of the coupling unit.

8. The robot hand according to claim 6, wherein
   a rotating shaft of the first gear and a rotating shaft of the first coupling member are coaxial with each other, and
   a rotating shaft of the second gear and a rotating shaft of the second coupling member are coaxial with each other.

9. The robot hand according to claim 1, wherein the driving unit moves the three or more finger units close to one another from directions different from one another and moves the three or more finger units away from one another in directions different from one another.

10. The robot hand according to claim 1, wherein at least one finger unit among the three or more finger units includes:
    a contact member including a bent section;
    a supporting member that rotatably supports the contact member in the bent section; and
    an elastic member that connects the contact member and the supporting member.

11. The robot hand according to claim 10, wherein the contact member is bent in a direction in which the finger unit closes.

12. The robot hand according to claim 10, wherein at least one finger unit among the three or more finger units includes a stopper that regulates a rotation angle of rotation of the contact member.

13. A robot apparatus comprising the robot hand according to claim 1.

14. A robot hand comprising:
    a motor;
    a worm wheel arranged in a rotating shaft of the motor and having spiral structure;
    a worm fit with the worm wheel and having a rotating shaft in a direction different from a direction of a rotating shaft of the worm wheel;
    a first worm including a rotating shaft coaxially with the rotating shaft of the worm and having spiral structure;
    a first gear fit with the first worm and including a rotating shaft in a direction different from a direction of the rotating shaft of the first worm;
    a second worm including a rotating shaft coaxially with the rotating shaft of the worm and having spiral structure, a spiral direction of which is different from a spiral direction of the first worm;
    a second gear fit with the second worm and including a rotating shaft in a direction different from the direction of the rotating shaft of the second worm;
    a first finger unit connected to the first gear;
    a second finger unit connected to the second gear;
    a third finger unit different from the first finger unit and the second finger unit; and
    a driving unit that opens and closes the first finger unit, the second finger unit, and the third finger unit.

* * * * *